United States Patent [19]

Jaffe

[11] Patent Number: 4,857,646

[45] Date of Patent: Aug. 15, 1989

[54] MODIFIED BETA-QUINACRIDONE PIGMENT

[75] Inventor: Edward E. Jaffe, Wilmington, Del.

[73] Assignee: Ciba-Geigy Corporation, Ardsley, N.Y.

[21] Appl. No.: 88,751

[22] Filed: Aug. 24, 1987

[51] Int. Cl.$^4$ .............................................. C09B 48/00
[52] U.S. Cl. ...................................... 546/49; 106/497
[58] Field of Search ........................................... 546/49

[56] References Cited

U.S. PATENT DOCUMENTS 2,844,485 7/1958 Struve .................................... 546/49
3,657,248 4/1972 Wagener ................................ 546/49

FOREIGN PATENT DOCUMENTS 0073924 6/1977 Japan ..................................... 546/49
0943597 12/1963 United Kingdom ................... 546/49

OTHER PUBLICATIONS

Obayashi, et al., Chemical Abstracts, vol. 70: 79227f (1969).
Niwa, et al., Chemical Abstracts, vol. 88: 91044y (1978).

*Primary Examiner*—Anton H. Sutto
*Assistant Examiner*—Diana G. Rivers
*Attorney, Agent, or Firm*—Harry Falber

[57] ABSTRACT

A new beta quinacridone polytype having a magenta color and a distinct X-ray diffraction pattern, said new form preferably having an average particle size of about 0.2–0.8 μm and being prepared by various wet milling or reflux procedures in alcohol-base systems.

27 Claims, 3 Drawing Sheets

MODIFIED BETA-QUINACRIDONE PIGMENT

Quinacridone, also referred to as 7,14-dioxo-5,7,12,14-tetrahydroquinolone(2,3-b)acridone, of the following formula

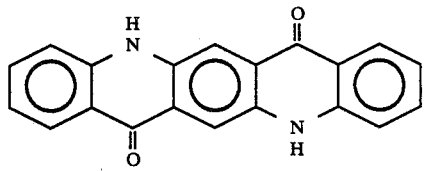

is known to exist in three polymorphic modifications. The alpha (U.S. Pat. No. 2,844,484) and gamma (U.S. Pat. Nos. 2,844,581 and 2,969,366) forms are bluish-red pigments, while the beta form (U.S. Pat. No. 2,844,485) is a violet pigment. The gamma polymorph in turn is known to exist in two forms, an older form (U.S. Pat. No. 2,844,581) which is bluish red, and a more recently recognized form (U.S. Pat. No. 3,074,950) which is yellowish red. The differences between these forms becomes tinctorially significant at relatively large particle size when the degree of crystallinity is high and the X-ray diffraction patterns are sharply defined.

By contrast, the beta polymorph has been known only in one form, its X-ray pattern having been described, for example, in U.S. Pat. No. 2,844,485 as having well defined lines corresponding to interplanar spacings of 15.23 Å, 7.55 Å, 5.47 Å, 4.06 Å and 3.31 Å. When converted to double glancing angles ($2\theta$), the pattern is defined by lines at 5.80, 11.72, 16.20, 21.84 and 26.94. The bands at 5.80 and 26.94 are characteristically much stronger than the other three.

It has now been surprisingly discovered that a second, distinct beta quinacridone form can also be prepared. The new form, designated $\beta_I$ for purposes of this application, has been identified when the polymorph is prepared by processes described in this application. It differs from the known beta form, $\beta_{II}$, by a distinctive X-ray diffraction pattern and a significant color shift from violet to magenta. The new form is of particular importance at a relatively large particle size, or low surface area, and at a high degree of crystallinity. At the preferred particle size, the new form shows considerable light scattering and consequent opacity, which is of particular importance in solid color automotive finishes.

The new beta form shows a significant change in the 16, 21, 22 and 27 double glancing angle region of the X-ray diffraction pattern vs. that of the known form. Thus, the weak band at 20.95 is totally unique to the new form. Further, the single band of $\beta_{II}$ at 16.20 double glancing angle is split into a doublet of about equal intensity, one band centered at 15.85 and the second slightly less intense band at 16.12 double glancing angle, and the bands centered at 21.84 and 26.94 are shifted to 22.28 and 27.36 double glancing angles, respectively. The complete X-ray diffraction pattern of the new beta quinacridone form, including weak bands in terms of interplanar spacing and corresponding double glancing angles, is as follows:

| interplanar spacings | | double glancing angles |
|---|---|---|
| 14.88Å | (s) | 5.94 $2\theta$ |
| 7.49 | (m) | 11.82 |
| 5.59 | (m) | 15.85 |
| 5.50 | (m) | 16.12 |
| 5.05 | (w) | 17.55 |
| 4.77 | (w) | 18.60 |
| 4.24 | (w) | 20.95 |
| 3.99 | (m) | 22.28 |
| 3.73 | (w) | 23.85 |
| 3.26 | (s) | 27.36 |

The accompanying drawings show the respective X-ray patterns wherein

Figure 1:
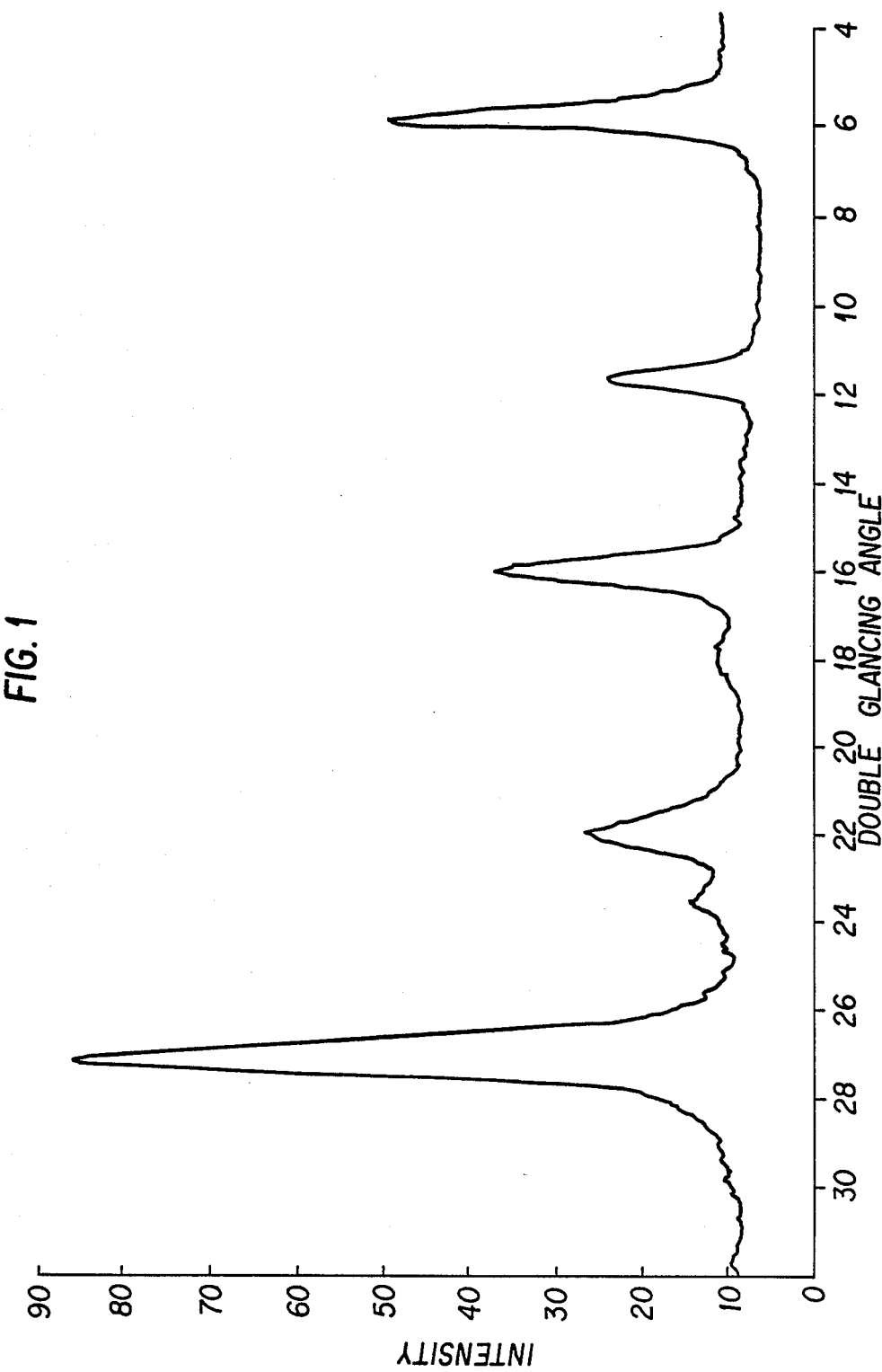
FIG. 1 is the X-ray pattern of small particle size (0.05–0.15 μm) conventional beta quinacridone ($\beta_{II}$)
Figure 2:
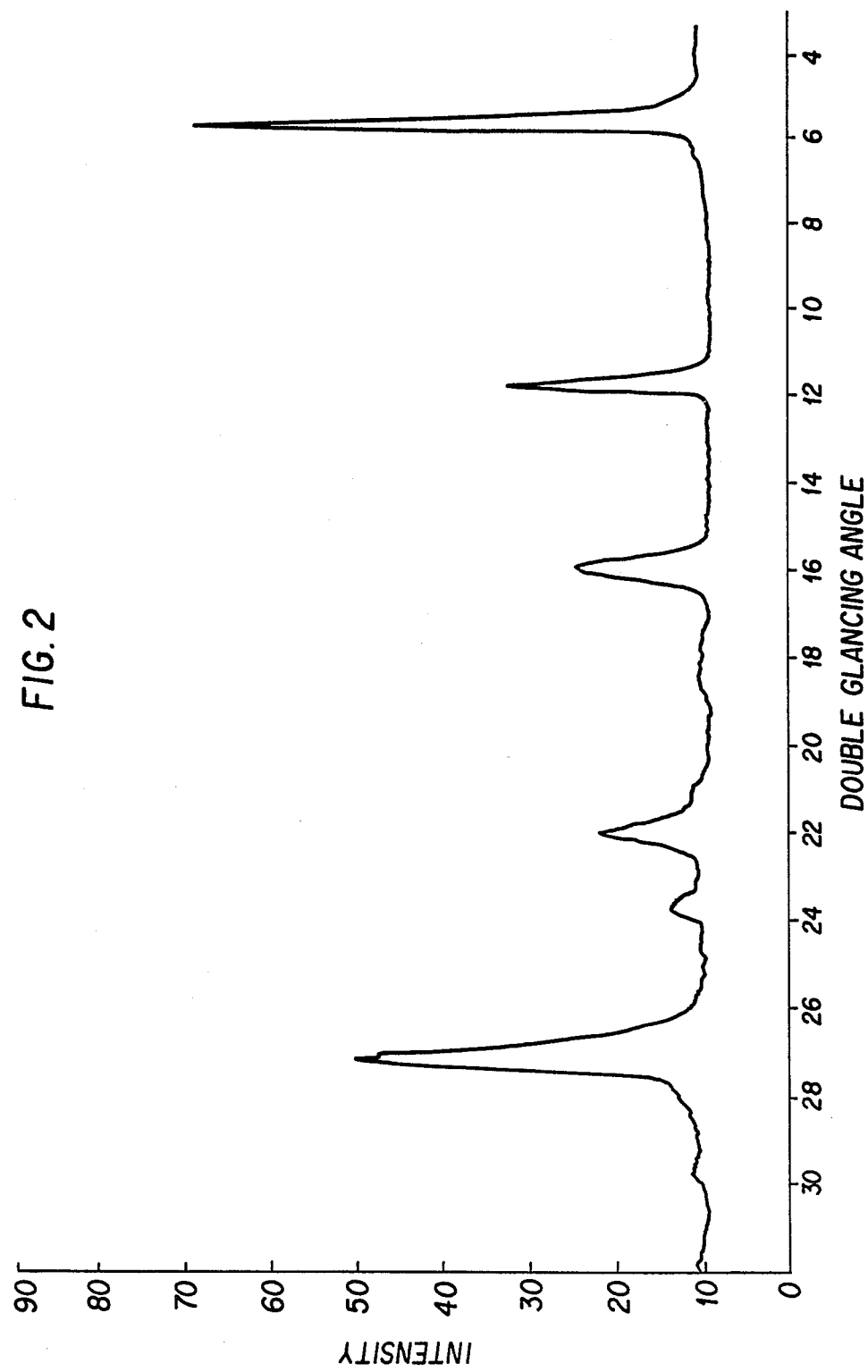
FIG. 2 is the X-ray pattern of crude, larger particle size (1.0–2.0 μm) conventional beta-quinacridone ($\beta_{II}$)
Figure 3:
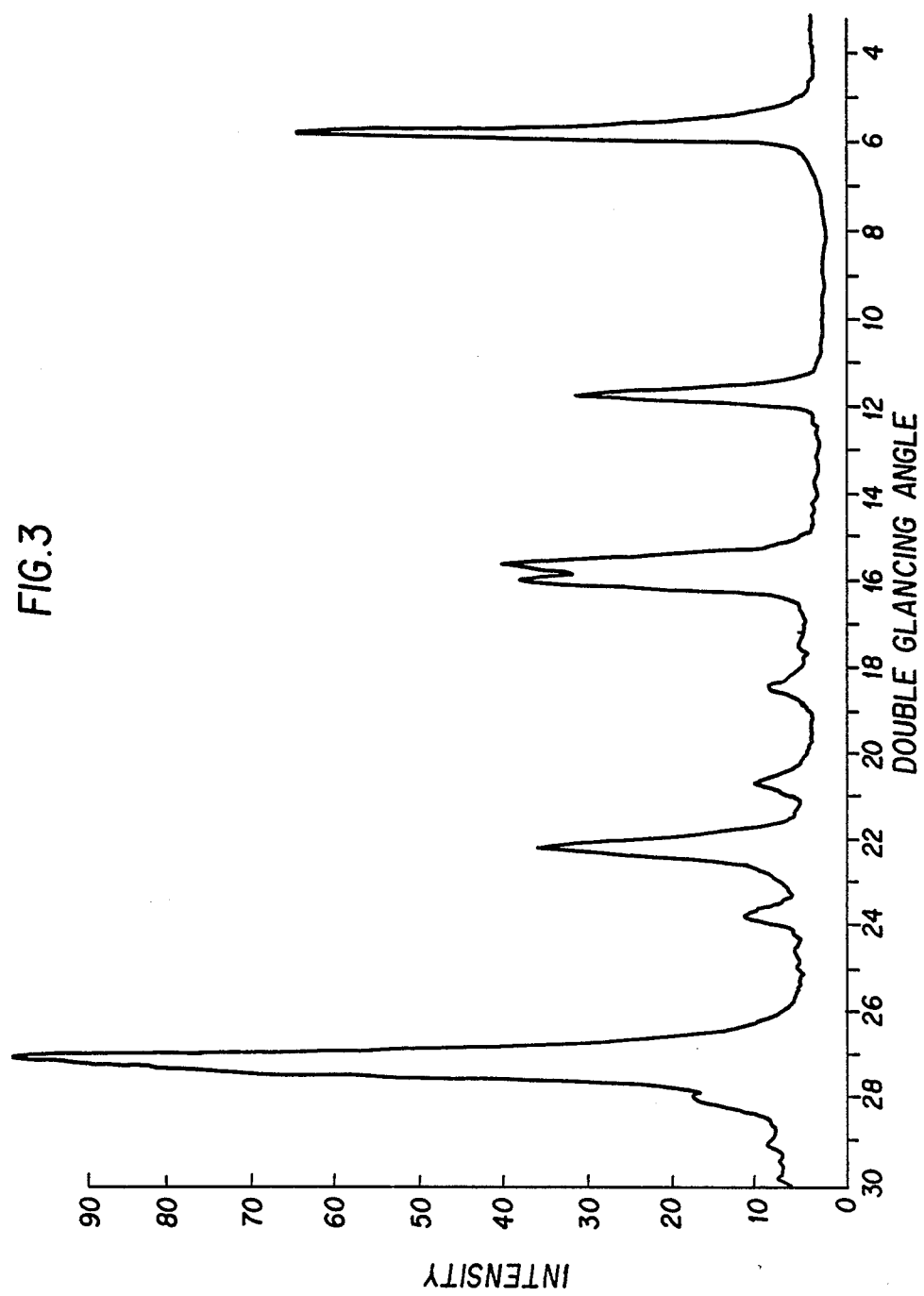
FIG. 3 is the X-ray pattern of the new form of beta quinacridone ($\beta_I$) of the invention.

In each instance, it is seen that the x-axis reflects double glancing angles while the y-axis reflects the intensity of the diffracted ray. The X-ray patterns were determined by a Phillips 2500D X-Ray Difractometer. The characteristic differences supporting the existence of a new beta form are particularly evident by a comparison of FIGS. 1 and 3.

As previously noted, the new beta quinacridone form has unexpectedly been found to be particularly useful in a specified particle-size range, expressed in terms of average particle size or specific surface area.

Organic pigments, synthesized in organic solvents, are generally generated in relatively large particle size. This also applies to the synthesis of quinacridone. Thus, in the first commercial synthetic process (U.S. Pat. No. 2,969,366), the final step involved oxidation of 6,13-dihydroquinacridone to quinacridone. The generated quinacridone was relatively large in particle size, the size depending on the identity of the phase. Thus, in order to obtain the gamma phase, it was necessary to convert the initial alpha 6,13-dihydroquinacridone (U.S. Pat. No. 3,009,916) to the beta form (U.S. Pat. No. 3,007,930) with oxidation of the latter yielding gamma quinacridone. The oxidation was accomplished in aqueous methanol or similar solvent at a relatively low sodium hydroxide concentration, usually below 10% (U.S. Pat. No. 2,969,366, Table I) and preferably at about 3%, based on total liquid in the oxidation reaction mixture. Under these conditions, a relatively large particle size pigment, having a surface area of 20–30m$^2$/g (U.S. Pat. No. 2,944,581) was obtained. However, such a crude pigment is relatively light, opaque, and weak. While the pigment is useful for styling of solid, opaque colors, maximum tinting strength or deep masstones for metallic finishes necessitate particle size reduction of the crude gamma quinacridone by a variety of methods to a pigment with a surface area of at least 60m$^2$/g (U.S. Pat. No. 2,844,581).

In contrast, when manufacturing beta quinacridone by oxidation of 6,13-dihydroquinacridone, the identity of the 6,13-dihydroquinacridone phase is immaterial since it is necessary to form its sodium salt which is then oxidized to the sodium salt of quinacridone and in situ hydrolyzed to beta quinacridone. In order to form the required intermediate sodium salt, the sodium hydroxide concentration has to be relatively high, usually over 10%, or as high as 29.5% (U.S. Pat. No. 2,969,366, Table I), based on total liquid in the oxidation reaction mixture. As a consequence of the high base concentration in conjunction with aqueous alcohol, the crude beta quinacridone is generated in large particle size, showing a specific surface area of 3 to 8m$^2$/g and a particle size in excess of 1 μm, exceeding the minimum particle size required for reasonable opacity, and showing exceedingly low strength in TiO$_2$ extension (tint) and a dark and reasonably transparent masstone. The product obtained from the oxidation is the conventional $\beta_{II}$ form. This crude product is not a useful pigment. When the crude product is particle size reduced to a pigment approaching at least 60m$^2$/g, as disclosed in U.S. Pat. No. 2,844,484, the product is a violet pigment of considerable value. However, to underscore the uselessness of the crude pigment, the same patent states that "experience has shown that materials of this type with specific surface measurements significantly below about 60m$^2$/g have been of such low tinctorial strength as to have little commercial significance".

It is to be noted that a comparison of the new $\beta_I$ form with the $\beta_{II}$ form of approximately the same particle size and surface area shows the latter to be significantly darker, bluer and duller in masstone and bluer and duller in tint relative to the new form.

It has correspondingly been demonstrated that a commercial small particle size beta quinacridone pigment (e.g. RT-795-D from Ciba-Geigy Corp, devoid of extender) particle size grown in hot dimethyl formamide fails to undergo a polymorphic form change during increase in particle size. Thus, upon heating the pigment in 15.5 times its weight of dimethyl formamide for various periods at various temperatures, products with surface areas ranging from 11.6m$^2$/g to 19.9m$^2$/g are obtained, these products being more opaque than the starting material but still being bluish in masstone and violet in tint, becoming progressively weaker as the surface area of the pigment becomes smaller.

Reference is also made to Japanese No. 56-45512 which discloses the preparation of beta quinacridones having particle size of 0.1-0.3 μm by oxidation of dihydroquinacridone in basified dimethylsulfoxide, followed by drowning the reaction mixture into methanol. These products are of the $\beta_{II}$ variety and by rubout are very dark in masstone and very blue in tint.

It has thus been additionally discovered that when the beta quinacridone form is generated as $\beta_I$ or a combination of $\beta_I$ and $\beta_{II}$ in a particle size (exceeding an average of 0.1 μm, preferably in the range of 0.2 to 0.8 μm) which corresponds approximately to a specific surface area of 9 to 25m$^2$/g, a product of considerable utility is obtained, particularly for automotive and industrial finishes and more particularly in combination with orange pigments for styling of solid reds of a variety of shades and hues. In this particle size range, its hiding power and lightfastness are also maximized. Applications are not, however, limited to these systems. Utility has also been demonstrated in plastics, water-based paints, etc. Like the conventional beta form, the $\beta_I$ form is a non-bleeding pigment.

Unexpectedly, the beta quinacridone with the above defined X-ray diffraction pattern and specific surface area also shows a very pronounced color shift in TiO$_2$ extension, as well as in the undiluted masstone color vs. its $\beta_{II}$ small particle size counterpart. The shift is to lower wavelengths, that is in TiO$_2$ extension the color is best characterized as a magenta rather than a violet, the latter being characteristic of the $\beta_{II}$ small particle size pigment counterpart. The new product is also substntially lighter and more opaque, which is characteristic of pigments with particles which effectively scatter visible light. This is a particularly useful property in the current climate because with the phasing out of opaque lead-based pigments from automotive and other coatings, hiding power has to be provided by organic pigments or by the addition of other pigments like iron oxides, which compromise color intensity or brightness. Unexpectedly, when incorporated into an automotive finish, the TiO$_2$ extended tint (for example at 25% pigment and 75% TiO$_2$) of the new pigment shows a reflectance spectrum which is virtually superimposable on a similar tint of bona fide magenta derived from substitutedqquinacridone (like 2,9-dichloroquinacridone) with the major peak centered at 570 nm but showing a steeper drop and a higher rise of the curve at higher wavelengths from about 600 nm to 650 nm. A similar comparison with a reflectance spectrum of a conventional beta (type II) quinacridone of higher surface area, shows a significant hypsochromic shift of the major band for the new product amounting to 8 nm, from 578 nm to 570 nm at the band peak, and the gap between the curves increases with increasing wavelength. Between 640 nm and 700 nm, the divergence of the curves is the greatest, the new product showing more reflectance and therefore less absorption of light relative to the known pigment. Visually, these shifts are responsible for a color in TiO$_2$ extension which is classified as a magenta for the new form, rather than a violet for the conventional pigment. Reflectance spectra comparisons of the new product vs. a known quinacridone magenta pigment shows the former also with greater reflectance and therefore less absorbance at longer wavelengths (640 to 700 nm), relative to the known pigment.

There are several methods for preparing the new pigment and for preparing it in the relatively low specific surface area form. The new pigment can be prepared either by controlled particle size reduction/ripening of a crude pigment or by overmilling of a crude and then growing the pigment particles to the desired size and surface area. Frequently, both particle size reduction and growth by crystallization can be achieved in a single operation. Obviously, in all cases, the polymorph and form identity must be preserved. Several methods are described below, all requiring particle ripening to obtain a pigment that is of the new polytype form, of the desired particle size and surface area, and is highly crystalline, which in part is responsible for the product's very good rheological characteristics and excellent outdoor durability.

Applicable procedures can be summarized as follows:

(1) Milling of alpha quinacridone, preferably of small particle size in the presence of alcohol and base.

(2) Milling of crude or large particle size $\beta_{II}$ quinacridone (surface area of 3-8 m$^2$/g) in the presence of alcohol and base and appropriate milling media.

(3) Conducting the second procedure in two steps with premilling of the crude beta quinacridone followed by ripening or particle size growth in a subsequent alcohol-base milling step.

(4) Particle ripening of a finished, particle size reduced beta quinacridone (a) by milling in the presence of alcohol and base, or (b) refluxing in basified alcohol.

Regarding procedure (1), it was unexpectedly found that alpha quinacridone, the least thermodynamically stable phase of quinacridone, preferably in small particle size, when milled in alcoholic base, undergoes not only particle ripening but also a complete conversion to beta quinacridone to yield the product of the present invention. By contrast, refluxing the same alpha quinacridone in the identical medium produces gamma quinacridone. Small particle size alpha quinacridone can be obtained by prolonged milling of gamma quinacridone. Sufficient energy has to be put into the system to effect complete conversion to alpha quinacridone and to simultaneously reduce particle size. Alternatively, any starting phase of quinacridone can be converted to alpha quinacridone by dissolving it in concentrated sulfuric acid, polyphosphoric acid, etc., and drowning the resulting solutions in water. After product isolation, washing, and drying, small particle size alpha quinacridone is obtained. Regardless of the method of preparation, subsequent milling of alpha quinacridone in alcohol containing base produces the desired beta quinacridone product as a highly crystalline, opaque, relatively strong, attractive magenta color.

Procedure (2) allows for the preparation of the same product from crude or large particle size $\beta_{II}$ quinacridone (surface area of 3 to 8m²/g) by a direct one-step process involving milling of the crude in basified alcohol with ceramic beads or steel shot to effect particle size reduction as well as crystal ripening. This dynamic particle size reduction/ripening system causes form conversion and reaches an equilibrium particle size which yields the product of this invention. By virtue of the two functions in the milling operation, and in order to maximize pigment tinctorial quality, it is preferred to maintain a relatively high liquid to pigment weight ratio of about 10–20:1. Milling in this procedure generally proceeds in a temperature range from 20° to 50° C. for a period of 24 to 72 hours. Available milling media include steel shot or ceramic beads.

The two-step process designated procedure (3), involves premilling of crude beta quinacridone such that particle size is reduced to highly aggregated subpigmentary size and ripening or particle size growth in a subsequent alcoholic base milling step. The premilling can be carried out with a variety of milling media, such as steel balls and nails, steel shot, or ceramic balls, or even the same ceramic beads used in the subsequent alcohol milling. If premilling is carried out with steel milling media, it is desirable to distill off the alcohol and extract the resulting aqueous pigment slurry with dilute mineral acid to remove any metal that wears off from the media during the milling operation. If acid extraction is to be avoided, as well as the usual slight color blue shift in masstone and tint caused by acid extraction, ceramic milling media are suggested. These can be used in the premilling as well as in the alcohol milling steps. This approach allows for higher pigment loading whereby the liquid to pigment weight ratio can be reduced to about 6.5:1.

In procedure (4a), a small particle size pigmentary beta quinacridone devoid of extenders can be milled in alcohol and base with ceramic media, and the pigment then isolated, after alcohol distillation, by filtration to yield a pigment of high opacity and magenta color. Alternatively, in procedure (4b), the same starting pigment can be simply refluxed in basified alcohol to produce a similar product which, however, usually tends to be somewhat less intense in masstone and somewhat weaker in tint.

As noted, if acid extraction is to be avoided in any of the indicated procedures, ceramic beads are the best alternative milling medium. A variety of sizes and compositions are available. Grinding beads of 1.6 to 2.5 mm or 2.5 to 3.15 mm size made from crystalline zirconia phase and amorphous silica phase by fusion of the oxides are particularly suitable. Zirconium oxide beads containing small amounts of magnesium oxide are similarly useful.

Premilling, as used in this invention, refers to milling in the complete absence of liquids, or if liquids are used, such as a phase directing solvent or a surface active agent, they are present in such small amounts (maximum of about 10% by weight of pigment) or of such a nature that the pigment retains the characteristics of a powder. The premilling is optionally carried out in the presence of a small amount, 10% or less, of a salt such as anhydrous sodium sulfate. The presence of the latter is intended to avoid possible explosivity of the generated millpowder.

If the starting material is gamma quinacridone, the premilling cycle has to be sufficiently long (generally 48 to 96 hours) to result in complete conversion to alpha quinacridone, before the subsequent liquid milling step will produce $\beta_I$ quinacridone of the proper surface area. If the starting material is beta quinacridone, the premilling cycle has to be adjusted to affect particle size reduction.

In the liquid milling step, whether starting with premilled or crude pigment, the resultant product and consequently the most stable phase in this medium is invariably beta quinacridone. Temperatures for the liquid milling step range from 20° to 50° C.

A variety of alcohols are applicable to produce the $\beta_I$ form including low boiling alcohols such as methanol, ethanol, butanol and pentanol and glycols such as ethylene glycol. The most suitable from the standpoint of tinctorial properties are methanol and ethanol. Likewise, a variety of inorganic and organic bases can be used including alkali metal hydroxides such as sodium hydroxide, potassium hydroxide or lithium hydroxide and quaternary ammonium hydroxides such as benzyltrimethylammonium hydroxide. Sodium and potassium hydroxide are preferred. If base is left out of the milling operation, conversion to the $\beta_I$ form and particle growth of the product are significantly reduced, leading to the $\beta_{II}$ form which is dark in masstone and blue in tint.

The alcohol is generally present in an amount ranging from 5 to 25 times the weight of pigment, and preferably 14 to 18 times.

In the absence of an appropriate amount of base, particle growth is minimal and conversion to the $\beta_I$ form is slow and incomplete. Accordingly, the preferred concentration range of base is 1 to 10%, based on the weight of methanol and preferably 2 to 6%. For example, at a 4% concentration of KOH, 4 parts of KOH (100% basis) are added as a 44% aqueous solution to 100 ml. of methanol. The preferred concentration of base, however, changes with the nature of the alcohol. Thus, in ethanol, a given reasonable base concentration affords similar particle growth and polytype purity as a significantly higher base concentration in methanol. In general, the ease of formation and solubility of a given salt will be a function of the nature of a particular solvent/base combination. At the desirable base concentration range, there is no visible formation of the quinacridone potassium, sodium or quaternary ammonium salt, which when formed can be easily recognized due to its distinct blue color. However, during the milling operation, as new surfaces are generated, the mechanism of particle growth is believed to involve formation of a very small concentration of the salt, which is more soluble in alcohol than quinacridone itself and thus subject to particle growth followed by alcoholysis to the pigment. This dynamic particle ripening system eventually permits total form conversion and particle growth to the desirable equilibrium size.

If desired, various surfactants, extenders or particle growth inhibitors or promoters can be introduced at the basified alcohol milling step (either one- or two-step approach) provided the additives are not inactivated by the basic medium and do not prevent $\beta_I$ form formation. Simple addition of anionic (subject to salt formation), cationic or nonionic surfactants to the liquid milling operation, assuming the materials are not water soluble, will cause them to come out in a uniform manner on the surface of the pigment during alcohol removal and, consequently, frequently alter the pigment properties. Thus, introduction of as little as 2% isopropyl amine salt of p-dodecylbenzenesulfonic acid, based on weight of pigment, produces a product which by rubout in lithographic varnish shows increased masstone yellowness and opacity relative to a product prepared without the surfactant.

Since the ultimate particle size is generated in the liquid milling step, the product can be isolated directly from the mill slurry after milling media separation, provided no acid extraction is required. However, the pigment is best isolated after alcohol removal by distillation. After the milling media have been separated and washed free of pigment, the resulting pigment slurry is either steam distilled, or diluted with water and alcohol distilled with external heat until the residue is essentially alcohol free. The alcohol is thus recovered and the pigment isolated from a nonflammable slurry by filtration. After isolation the pigment is washed free of base with water. The resulting pigment has a magenta color, showing a pronounced color shift vs. known or commercial beta quinacridone pigments. The pigment shows excellent outdoor durability and outstanding hiding power or opacity relative to any other known beta quinacridone pigments. In view of these properties, it is a valuable pigment in styling industrial and particularly automotive finishes, either as a single pigment but particularly in combination with other pigments to produce exceptionally intense solid reds of varying shades.

Like many other pigments, the product is advantageously surface treated by known methods to improve its performance in a variety of automotive and other finish systems. Additives which serve to lessen or avoid flocculation and increase pigment dispersion stability can be advantageously used with this pigment. When so treated, the pigment shows outstanding performance on its own but particularly as a blending agent for styling of solid reds in a variety of systems but particularly in automotive finishes, such as acrylics, alkyds, polyester and other systems. 2-Phthalimidomethylquinacridone, quinacridonesulfonic acid, or other similar derivatives can serve as additive antiflocculating agents. In some systems, the addition of polymeric dispersants further improves the performance of this pigment.

Pigmented systems which contain the pigment as a component of mixtures of substances, possibly in addition to other components, include: pastes, flush pastes, preparations, printing colors, distempers, binder colors or lacquers and varnishes of all kinds, such as physically and oxidatively drying lacquers and varnishes, acid, amine and peroxide curing varnishes or polyurethane varnishes. The pigment may also be present in synthetic, semisynthetic or natural macromolecular substances, such as thermoplastic resins, e.g., polyvinyl chloride, polystyrene, polyethylene, polyesters, phenoplasts, aminoplasts and rubber. The pigment may also be present in admixture with natural, regenerated or synthetic fibers, such as glass, silicate, asbestos, wood cellulose, acetylcellulose, polyacrylonitrile, polyester, polyurethane and polyvinyl chloride fibers or mixtures of the same, and also in powders, for example organic or inorganic pigments. With the new pigment there are obtained prints, paint and varnish coatings, coverings, shaped articles, such as sheets, threads, plates, blocks, granulates and rods with a brilliant red color of excellent durability.

The mixtures of substances which contain as active coloring ingredient the magenta pigment of good hiding power, may be of solid, elastic, pasty, viscous, mobile or thixotropic consistency. They may be obtained by conventional methods. Aqueous pastes may be obtained for example by stirring the pigment into water, possibly with the addition of a wetting or dispersing agent or by stirring or kneading the pigment into a dispersing agent in the presence of water and possibly of organic solvents or oils. These pastes may for example be used for the production of flush pastes, printing colors, distempers, plastic dispersions and spinning solutions. The pigment may also be introduced by stirring, rolling, kneading or grinding into water, organic solvents, nondrying oils, drying oils, lacquers, varnishes, plastics or rubber. Finally, it is also possible to work up the pigment by dry mixing with organic or inorganic masses, granulates, fibrous materials, powders and other pigments, to form mixtures of substances.

In addition to its excellent hiding power, outstanding purity of shade and good general fastness, such as fastness to light and weathering and solvent and softener resistance, the pigment is also characterized by superior resistance to high temperatures. For example, the thermal behavior of the pigment makes it possible to work it into high and low density polyethylene or polypropylene, without the shade of color being dulled by the effect of the temperature during working up.

Nothwithstanding that the key aspect of the instant invention is the preparation of the new beta quinacridone polytype, it is to be noted that the invention is deemed to include pigments resulting from the above noted processes (1)-(4) which comprise blends of the new beta quinacridone and minor amounts, i.e. less than about 50%, by weight, of conventional $\beta_{II}$ quinacridone. The blends exhibit the distinguishing characteristics and the pigmentary properties of the $\beta_I$ quinacridone, although to a somewhat lesser degree.

The following examples further illustrate the embodiments of this invention. In these examples, all parts given are by weight unless otherwise indicated.

EXAMPLE I

This example describes preparation of the $\beta_I$ form by the one-step process using ceramic beads to avoid acid extraction.

A 2.85 liter mill is charged with 2500 parts ceramic beads ranging in size from 1.6 to 2.5 mm and consisting on average of about 69% $ZrO_2$ and 31% $SiO_2$, 50 parts crude beta quinacridone, 791 parts methanol and 75 parts 44% aqueous potassium hydroxide. The mill is rotated for 72 hours at about 30° C. and 68 RPM which is about 74% of critical speed ("critical speed" is the speed at which the centrifugal force overcomes the force of gravity so that the grinding elements are retained against the outer wall of the mill). The mill is discharged onto a screen which retains the ceramic beads. The beads are washed with 630 parts methanol, essentially all pigment being collected as a slurry. The slurry is transferred to a four-neck flask equipped with a stirrer, thermometer, Dean-Stark tube and condenser. Steam is passed through the slurry and methanol together with some water is distilled off. The temperature slowly rises to 95° C. as the methanol is distilled off and is maintained for 10 minutes whereupon the distillation is discontinued. The product is isolated by filtration from the hot slurry and the pigment washed free of base with warm water. After drying at 80° C., 48.0 parts of pigment are obtained. Its X-ray pattern is that as described hereinabove for the new beta quinacridone form with a surface area of 17.0m$^2$/g. By rubout in a lithographic varnish, it shows an opaque masstone and a magenta color in TiO$_2$ extension.

Alternatively, dilution water (1000 parts) can be added to the methanol slurry and the alcohol distilled with external heat until the slurry temperature reaches 95° C. The pigment is isolated from the resulting slurry in identical manner leading to a product of the same characteristics and a surface area of 17.5 m$^2$/g.

As noted, pigmentary qualities are determined utilizing rubout in lithographic varnish prepared with a Hoover Muller. The apparatus is equipped with a ½ HP 110-22 V, 60 cycle motor and two glass plates. The muller can be adjusted to stop after 25, 50, 75, or 100 revolutions with 50 revolutions being considered normal. Three weights are used which apply 150 pounds pressure between the plates. In each case, 0.6 parts of dry pigment and 1.2 parts of a lithographic varnish drier are mixed with a spatula on the lower glass plate. The upper plate is locked to the lower plate and the motor is set to stop after fifty revolutions. The plates are separated and the pigment in ink dispersion is picked up and spread out again on the lower plate and the operation repeated six more times. The resulting pigment as an ink dispersion, referred to as the masstone ink, is drawn down versus an appropriate control prepared in the identical manner. In order to assess color strengths of the samples, calculated amounts of the masstone ink (0.18 parts) and a zinc oxide paste dispersion (10 parts) are weighed accurately and mixed with a spatula on a polished glass plate. The resulting appropriate control is prepared in an identical manner. Visual comparison of both the masstones and tints are made wet and after drying at room temperature for several days.

EXAMPLE II

This example describes a two-step process for preparing the quinacridone in predominant $\beta_I$-form.

A pilot plant scale ball mill is charged with 454,000 parts of steel cylinders approximately 127 mm in diameter and 127 mm in length, 45,400 parts of "twenty penny" 100 mm nails, 18,160 parts crude beta quinacridone and 1,816 parts anhydrous sodium sulfate. The mill is rotated at 40 RPM which is about 75% of the critical speed for 50 hours at 55°-60° C. The mill is opened and its contents discharged through a screen which retains the steel cylinders and nails. A portion of the resulting millpowder (132 parts) is then charged into a 2.85 liter ball mill containing 4800 parts of 3.2 mm diameter steel shot. The mill is further charged with 791 parts of methanol and 75 parts of 44% aqueous KOH, sealed and rotated at about 68 RPM for 72 hours. The mill is discharged onto a screen which retains the shot. The milling media are washed with methanol and the resulting slurry transferred to a distillation flask, diluted with 1200 parts water and distilled until the temperature of the slurry reaches 93° C. The slurry is cooled to 80°-85° C. and acidified with 30% sulfuric acid to pH=1.4-1.5. The slurry is maintained with stirring at 80°-85° C. for one hour and the product is isolated by filtration and washed with hot water (60°-70° C.) until free of acid. The product is dried at 80° C. to yield 113.5 parts of pigment predominantly in the $\beta_I$ form with a surface area of 19.0 m$^2$/g.

By rubout in lithographic varnish (procedure of Example I), the product is similar, although somewhat darker, in masstone and bluer in tint (extension with TiO$_2$) relative to the product of Example I.

EXAMPLE III

This example illustrates the conversion of a small particle size finished quinacridone product devoid of extender to the $\beta_I$ form.

(A) Milling in alcohol and base

A 236 ml laboratory scale ball mill is charged with 300 parts of 1.6 mm–2.5 mm ceramic beads, 79 parts ethanol, 7.5 parts of 44% potassium hydroxide and 6 parts of particle size reduced beta ($\beta_{II}$) quinacridone (RT-795-D by Ciba-Geigy Corp., devoid of extender). The mill is rotated for 72 hours at about 75% of critical speed. The pigment slurry is separated from the beads and the latter washed with methanol. The combined slurries are steam distilled until the temperature of the aqueous pigment slurry rises to 95° C. The temperature is maintained for about 15 minutes, the pigment isolated by filtration, washed free of base with water and dried.

The recovered pigment (5.5 parts) has a specific surface area of 16.4m$^2$/g. It is shown to be $\beta_I$ by X-ray diffraction. Rubout in lithographic varnish shows the pigment to be a good approximation of the product of Example I.

(B) Reflux in alcohol and base

A 4-neck round bottom flask equipped with a stirrer, thermometer and reflux condenser is charged with three parts of a particle size reduced beta ($\beta_{II}$) quinacridone (RT-795-D by Ciba-Geigy Corp., devoid of extender), followed by 39.5 parts anhydrous ethanol and 2.3 parts of 50% sodium hydroxide. The mixture is stirred, heated to reflux and maintained at reflux for six hours. The hot slurry is filtered, the product washed with alcohol and with hot water until the filtrate is essentially free of base to litmus paper, and dried. The resulting product (2.6 parts) is predominantly $\beta_I$ quinacridone having a surface area of 11.5 m$^2$/g. By rubout in lithographic varnish, the pigment is a close approximation of the product of Example I. It is significantly yellower and much more intense in masstone, and yellower in tint vs. a $\beta_{II}$ pigment of comparable surface area.

EXAMPLE IV

This example describes a further two-step preparative process.

Example II is repeated in identical manner with the exception that 4800 parts of steel shot is replaced by 2500 parts of 1.6-2.5 mm ceramic beads in the second liquid milling step. Pigment (109.7 parts) is obtained having a surface area of 18.5 m$^2$/g and tinctorial properties by rubout approximating the product of Example II.

If the same procedure is repeated but acid addition and extraction are omitted and the pigment isolated after alcohol distillation, 111.8 parts of a magenta pigment are isolated. The product, which is predominantly in the $\beta_I$ form, has a specific surface area of 19.4 m²/g and tinctorial properties approximating those of the acid extracted counterpart.

EXAMPLE V

This example describes preparation of the new pigment of conversion of gamma quinacridone.

A 945 ml laboratory scale ball mill is charged with 850 parts ceramic beads ranging in size from 1.6–2.5 mm consisting on average of about 69% $ZrO_2$ and 31% $SiO_2$, 12 parts crude gamma quinacridone and 1.2 parts anhydrous sodium sulfate. The mill is rotated at room temperature for 72 hours at about 74% of the critical speed. A small amount of the beads to which the pigment adheres is removed from the mill and the pigment washed off with methanol. The pigment is isolated by filtration, dried and examined by X-ray diffraction. The material is much less crystalline than the starting material and is completely converted to the alpha quinacridone polymorph.

A 236 ml laboratory scale ball mill is charged with 305 parts of the beads to which the alpha quinacridone adheres, 79.1 parts methanol and 10 parts of 50% aqueous sodium hydroxide, and the mill rotated for 72 hours at about 75% of its critical speed. The mill is discharged onto a screen which retains the ceramic beads. The beads are washed with methanol. Water is added to the slurry to flocculate the pigment and it is isolated by filtration, followed by washing with water to neutrality. After drying, 3.7 parts of a pigment is obtained which is comparable in appearance and performance to the product of Example II.

EXAMPLE VI

This example describes the new product preparation from alpha quinacridone.

To 825 parts of concentrated sulfuric acid stirred at a temperature under 20° C. is added 110 parts crude gamma quinacridone. Stirring is continued for 15 minutes until all solid is completely dissolved. The solution is added over a period of three minutes to a well-stirred slurry of 2750 parts of ice and water, while maintaining the temperature below 40° C. The resulting slurry of pigment in water is stirred for one hour at ambient temperature, and the product is isolated by filtration, followed by washing with water until the product is acid free. After drying, 107 parts of quinacridone is obtained which, by X-ray diffraction, is shown to be the alpha polymorphic form.

A 2.85 liter ball mill containing 2500 parts ceramic beads ranging in size from 1.6–2.5 mm is charged with 50 parts of the alpha quinacridone, 791 parts methanol and 75 parts 44% aqueous potassium hydroxide. Milling and work up is carried out exactly as described in Example I. Product recovery is 48.2 parts. Utilizing X-ray diffraction and rubout in lithographic varnish, the product is determined to be essentially identical to the pigment of Example II. The surface area of the product is 17.2 m²/g.

EXAMPLE VII

This example shows the use of sodium hydroxide instead of potassium hydroxide in the liquid milling operation.

Example I is repeated with the exception that 65.5 parts of 36.0% aqueous sodium hydroxide is used in place of the 75 parts of 44% aqueous potassium hydroxide. The workup is exactly the same as described in Example I.

By X-ray diffraction and by rubout in lithographic varnish, the product is practically identical to the pigment described in Example I. Its surface area is 17.2 m²/g.

EXAMPLE VIII

This example illustrates the use of ethanol rather than methanol in the liquid milling step.

A 236 ml laboratory scale ball mill is charged with 300 parts of 1.6 mm–2.5 mm ceramic beads, 79 parts anhydrous ethanol, 5 parts of aqueous potassium hydroxide and 6 parts of crude beta quinacridone. The mill is rotated for 72 hours at about 75% of critical speed. The pigment slurry is separated from the beads and the latter washed with water. The combined slurries are steam distilled until the temperature of the aqueous pigment slurry rises to 95° C. The temperature is maintained for 10 minutes, the pigment isolated by filtration, washed free of base with water and dried. Weight of pigment is 5.8 parts. It is shown to be $\beta_I$ by X-ray diffraction. Rubout in lithographic varnish shows the product to be somewhat yellower in masstone and weaker in tint vs. the product of Example I. The X-ray diffraction pattern of the product of this example is reflected in FIG. 3.

EXAMPLE IX

This example illustrates the use of an organic base in the liquid milling procedure.

A 236 ml laboratory scale ball mill is charged with 300 parts of 1.6 mm–2.5 mm ceramic beads, 71 parts methanol, 39 parts of 40% benzyltrimethylammonium hydroxide in methanol and six parts of crude beta quinacridone. The milling and product isolation is carried out according to the procedure of Example VIII. Weight of recovered pigment is 5.5 parts. Rubout in lithographic varnish shows the product to be a good approximation of the product of Example I.

EXAMPLE X

This example shows the beneficial effect of product surface modification on rheology of a basecoat/clearcoat acrylic enamel paint dispersion system.

Example I is repeated and after the methanol has been distilled off and the temperature of the aqueous slurry has reached and been maintained for ten minutes at 95° C., the slurry is cooled to 80°–85° C. and acidified with 40% sulfuric acid to a pH 4. The slurry is treated with 9.8 parts of alum followed by an aqueous slurry of 2.0 parts quinacridone monosulfonic acid in 66 parts water over a period of a half hour. This results in the precipitation on the surface of the pigment of about 4.1% aluminum quinacridonemonosulfonate. Heating at 80°–85° C. is continued for another half hour. The product is isolated by filtration, washed with hot water until free of acid and dried. Finished pigment (50.3 parts) is recovered having a surface area of 14.5 m²/g.

In order to determine the performance characteristics thereof, the pigment is dispersed in a conventional manner in an acrylic base coat/clear coat enamel and the resulting millbase containing 11.98%, by weight, pigment and 39.6%, by weight, total nonvolatile solids and a pigment to binder ratio of 0.43 is measured for viscosity using a Brookfield Digital Viscometer (Model RVTD) at 10 rpm, spindle #3, at 23° C., expressed in centipoises.

After letdown of the millbase and paint preparation, a masstone paint panel (10 cm×15 cm 10 gauge aluminum, gray acrylic primed panel spray painted to visual hiding over a black and white checkerboard) is prepared and dried, 20° gloss is then measured with a gloss meter Glossguard System 20/60/85 (Model G67526) and distinctness of image (DOI) determined according to ASTM utilizing a DOI meter from Paul Gardener Company Inc. The results are noted in the following table.

|  | Viscosity (cps) | Masstone Basecoat 20° gloss | DOI |
|---|---|---|---|
| Untreated pigment | 7110 | 69 | 50 |
| Product of this Example | 30 | 74 | 70 |

The product of this example thus shows a significant advantage in rheology vs. a similar product not surface treated. In addition, the surface characteristics of gloss and DOI of the basecoat finish incorporating the pigment of this example show an advantage over the surface untreated counterpart.

EXAMPLE XI

This example shows the beneficial effect of product surface modification on rheology of an alkyd paint dispersion and the appearance of the resultant automotive finish.

The product prepared in Example I is co-pulverized, based on pigment weight, with 3% and 6% of 2-phthalimidomethylquinacridone and a polymeric dispersant (derived by isolation of the dry polymer from DISPERBYK 160 from BYK-Chemie), respectively. When incorporated in an alkyd automotive paint system in a conventional manner vs. an untreated Example I pigment, improvement in viscosity of the dispersion and gloss and distinctness of image (DOI) of the finish is realized.

|  | Viscosity (cps) | Masstone Basecoat 20° gloss | DOI |
|---|---|---|---|
| Untreated pigment | 610 | 72 | 65 |
| Product of this Example | 130 | 86 | 97 |

The finish shows the unique magenta color of the new pigment in masstone and in tint (TiO$_2$ extension) and an exceptionally intense red styling obtained by combining the product of this example with an orange blending pigment (Pigment Orange 36).

EXAMPLE XII

This example shows the performance of the pigment of Example XI in high density polyethylene.

Five hundred parts of high density polyethylene flakes are added to a Banbury mixer (Model BR, size 82Br, Farrel Company, Ansonia, Connecticut) while the rotors are turning at minimum speed, followed by 10 parts of pigmentary titanium dioxide, 1 part of the pigment blend generated in Example IX and another 500 parts of high density polyethylene flakes. The speed of the rotors is increased to 200 RPM and the mixture processed at 116° C. to obtain a uniform blend of resin and pigment. The resulting blend is cut into coarse pieces, then granulated into a coarse powder, and injection molded into five sets of chips at the following temperatures: 204° C., 232° C., 260° C., 288° C. and 316° C. The degree of color degradation undergone by the pigment during the extruding operation is determined by comparing the colors of the chips at the above temperatures. The color changes at the four higher temperatures are assessed either visually or instrumentally and compared with the color of the chip extruded at 204° C. A rating of 9.5 indicates nearly complete color stability at the noted temperature; 8 indicates slight change; 6 indicates considerable change. The test results are as follows:

| Pigment | | Color Values at Extrusion Temperature (°C.) | | | |
|---|---|---|---|---|---|
|  | 204 | 232 | 260 | 288 | 316 |
| Pigment blend of Example XI | Magenta 9.5 | 9.0 | 8.6 | 8.5 | |
| Commercial beta QA product for plastics (RT-891-D from CIBA-GEIGY Corp.) | Violet 9.5 | 8.0 | 7.5 | 7.0 | |
| Commercial beta QA product for plastics (RT-791-D from CIBA-GEIGY Corp.) | Violet 9.5 | 7.5 | 6.5 | 6.0 | |

As can be seen from the data, the pigment of this invention is superior in heat stability to commercially used pigments in plastic applications.

Summarizing, it is seen that this invention provides a new beta quinacridone pigment form and processes for the preparation thereof in desired particle sizes. Variations may be made in proportions, procedures and materials without departing from the scope of the invention as defined by the following claims.

What is claimed is:

1. A magenta quinacridone pigment in beta crystal form characterized by an X-ray diffraction pattern exhibiting two strong lines corresponding to interplanar spacings of 14.88 Å and 3.26 Å, four medium strength lines corresponding to 7.49 Å, 5.59 Å, 5.50 Å and 3.99 Å, and four relatively weak lines corresponding to 5.05 Å, 4.77 Å, 4.24 Å and 3.73 Å.

2. The beta quinacridone pigment of claim 1, the particles of which have an average size in excess of about 0.1 μm.

3. The beta quinacridone pigment of claim 2, wherein said average particle size ranges from 0.2–0.8 μm.

4. The beta quinacridone pigment of claim 1 in combination with minor amounts of a violet beta form quinacridone pigment characterized by an X-ray diffraction pattern exhibiting lines corresponding to interplanar spacings of 15.23 Å, 7.55 Å, 5.47 Å, 4.06 Å and 3.31 Å.

5. A process for preparing the magenta beta crystal phase quinacridone of claim 1, which comprises milling alpha-phase quinacridone in the presence of effective converting amounts of an alcohol and a base and isolating the magenta beta phase quinacridone.

6. The process of claim 5, wherein said alcohol is low boiling and is selected from the group consisting of alkanols and glycols.

7. The process of claim 6, wherein said alcohol is selected from the group consisting of methanol, ethanol, butanol, pentanol and ethylene glycol.

8. The process of claim 7, wherein said alcohol is methanol or ethanol.

9. The process of claim 5, wherein said base is an alkali metal hydroxide.

10. The process of claim 9, wherein said base is sodium or potassium hydroxide.

11. The process of claim 5, wherein said base is a quaternary ammonium hydroxide.

12. The process of claim 5, wherein said alcohol is methanol and said base is sodium hydroxide.

13. The process of claim 5, wherein said alcohol is present in an amount ranging from 5 to 25 times the weight of said quinacridone, and said base is present in an amount ranging from 1.0 to 10.0%, by weight of said alcohol.

14. A process for preparing the magenta beta crystal phase quinacridone of claim 1, which comprises milling crude beta phase quinacridone or beta phase quinacridone having a specific surface area of about 3–8 square meters/gram in the presence of effective converting amounts of an alcohol and a base, said crude or large partical size beta quinacridone being characterized by an X-ray diffraction pattern exhibiting lines corresponding to interplanar spacings of 15.23 Å, 7.55 Å, 5.47 Å, 4.06 Å and 3.31 Å, and isolating the magenta beta phase quinacridone.

15. The process of claim 14, wherein said alcohol is methanol and said base in sodium hydroxide.

16. The process of claim 14, wherein the weight ratio of liquid to pigment is about 10–20:1.

17. A process for preparing the magenta beta crystal phase quinacridone of claim 1, which comprises the steps of dry premilling crude beta phase quinacridone or beta phase quinacridone having a specific surface area of 3–8 square meters/gram, said crude or large particle size beta quinacridone being characterized by an X-ray diffraction pattern exhibiting lines corresponding to interplanar spacings of 15.23 Å, 7.55 Å, 5.47 Å, 4.06 Å and 3.31 Å, milling the premilled quinacridone in the presence of effective particle growth promoting amounts of an alcohol and a base and isolating the magenta beta phase quinacridone.

18. The process of claim 17, wherein said alcohol is low boiling and is selected from the group consisting of alkanols and glycols.

19. The process of claim 18, wherein said alcohol is selected from the group consisting of methanol, ethanol, butanol, pentanol and ethylene glycol.

20. The process of claim 19, wherein said alcohol is methanol or ethanol.

21. The process of claim 17, wherein said base is an alkali metal hydroxide.

22. The process of claim 21, wherein said base is sodium or potassium hydroxide.

23. The process of claim 17, wherein said base is a quaternary ammonium hydroxide.

24. The process of claim 18, wherein said alcohol is methanol and said base is sodium hydroxide.

25. The process of claim 18, wherein said alcohol is present in an amount ranging from 5 to 25 times the weight of said crude quinacridone, and said base is present in an amount ranging from 1.0 to 10.0%, by weight of said alcohol.

26. A process for preparing the magenta beta crystal phase quinacridone of claim 1, which comprises milling a pigmentary, particle size reduced beta quinacridone in the presence of effective converting amounts of an alcohol and a base, said beta quinacridone being characterized by an X-ray diffraction pattern exhibiting lines corresponding to interplanar spacings of 15.23 Å, 7.55 Å, 5.47 Å, 4.06 Å and 3.31 Å, and isolating the magenta beta phase quinacridone.

27. A process for preparing the magenta beta crystal phase quinacridone of claim 1, which comprises refluxing a pigmentary, particle size reduced beta quinacridone in effective converting amounts of an alcohol and a base, said beta quinacridone being characterized by an X-ray diffraction pattern exhibiting lines corresponding to interplanar spacings of 15.23 Å, 7.55 Å, 5.47 Å, 4.06 Å and 3.31 Å, and isolating the magenta beta phase quinacridone.

* * * * *